(12) United States Patent
Sundaram et al.

(10) Patent No.: US 7,805,360 B2
(45) Date of Patent: Sep. 28, 2010

(54) TEMPLATE BASED MATCHING

(75) Inventors: Seshadri Sundaram, Aurora, IL (US); Stanislav Liberman, Buffalo Grove, IL (US); James W. Farrell, Wheaton, IL (US); Michael S. Kenniston, San Jose, CA (US); Dileep C. Konduru, Palatine, IL (US); Mark W. Robinson, Oak Park, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 145 days.

(21) Appl. No.: 11/617,915

(22) Filed: Dec. 29, 2006

(65) Prior Publication Data

US 2008/0086405 A1 Apr. 10, 2008

Related U.S. Application Data

(60) Provisional application No. 60/826,630, filed on Sep. 22, 2006.

(51) Int. Cl.
*G06Q 40/00* (2006.01)

(52) U.S. Cl. .......................................... 705/37; 705/35
(58) Field of Classification Search .................... 705/37
See application file for complete search history.

(56) References Cited

U.S. PATENT DOCUMENTS

| | | | |
|---|---|---|---|
| 2003/0200167 A1* | 10/2003 | Kemp et al. .................... 705/37 |
| 2004/0030635 A1* | 2/2004 | Marigliano .................... 705/37 |
| 2006/0106708 A1* | 5/2006 | Abushaban et al. ........... 705/37 |

* cited by examiner

*Primary Examiner*—James A Kramer
*Assistant Examiner*—James A Vezeris
(74) *Attorney, Agent, or Firm*—Banner & Witcoff, Ltd.

(57) ABSTRACT

Systems and methods for matching orders are provided. One or more trade templates are created. The trade templates define groups of orders for financial instruments that may be combined such that all of the orders are matched. New orders and resting orders are analyzed using one or more trade templates to determine whether a combination of orders satisfies all of the elements of a trade template. When all of the elements of a trade template are satisfied, the corresponding orders may be matched contemporaneously.

17 Claims, 7 Drawing Sheets

TEMPLATE BASED MATCHING

The present application claims priority to U.S. Provisional Patent Application Ser. No. 60/826,630, filed Sep. 22, 2006, the entire disclosure of which is hereby incorporated by reference.

FIELD OF THE INVENTION

The present invention relates to systems and methods that are utilized in connection with the trading of financial instruments. More particularly, trade templates are created to define groups of orders for financial instruments that may be combined such that all of the orders are matched.

DESCRIPTION OF THE RELATED ART

Traders often desire to trade defined combinations of financial instruments. For example, butterfly and calendar spread products consist of well defined legs. Typically an exchange attempts to match an order for a spread product with another order for the same spread product. Some existing exchanges attempt to match orders for spread products with multiple orders for legs of the spread products. With such systems, every spread product contract is broken down into a collection of legs and an attempt is made to match orders for the legs. Each leg of a spread instrument may in turn be either an outright or a spread instrument and is matched against an order for the same instrument.

Large exchanges typically list numerous outright and spread. Market liquidity can be limited by segregating orders into numerous order books with limited ability to match combinations of orders.

Therefore, there exists a need in the art for improved systems and methods for matching groups of orders for financial instruments.

SUMMARY OF THE INVENTION

Aspects of the invention overcome at least some of the above problems and limitations by providing systems and methods for matching orders that utilize one or more trade templates. The trade templates define groups of orders for financial instruments that may be combined such that all of the orders' legs are matched. The orders may include a plurality of orders for spread products and outright products.

In one embodiment order books are analyzed to generate a collection of needed orders that each when combined with one or more existing orders meet the requirements of one of the acceptable trade templates. New orders are then compared to orders in the collection of needed orders. When the new order matches one of the needed orders, a trade is executed between the new order and an order corresponding to the needed order. Trades for other orders corresponding to a template may also be executed contemporaneously with the execution of the trade between the new order and the order corresponding to the needed order In other embodiments, the present invention can be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description and drawings, and from the claims.

BRIEF DESCRIPTION OF THE DRAWINGS

Aspects of the invention may take physical form in certain parts and steps, embodiments of which will be described in detail in the following description and illustrated in the accompanying drawings that form a part hereof, wherein.

DETAILED DESCRIPTION

The present invention may take physical form in certain parts and steps, embodiments of which will be described in detail in the following description and illustrated in the accompanying drawings that form a part hereof.

Exemplary Operating Environment

Aspects of the present invention are preferably implemented with computer devices and computer networks that allow users to exchange trading information. An exemplary trading network environment for implementing trading systems and methods is shown in FIG. 1.

An exchange computer system 100 receives orders and transmits market data related to orders and trades to users. Exchange computer system 100 may be implemented with one or more mainframe, desktop or other computers. In one embodiment, a computer device uses a 64-bit processor. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.

Figure 1:
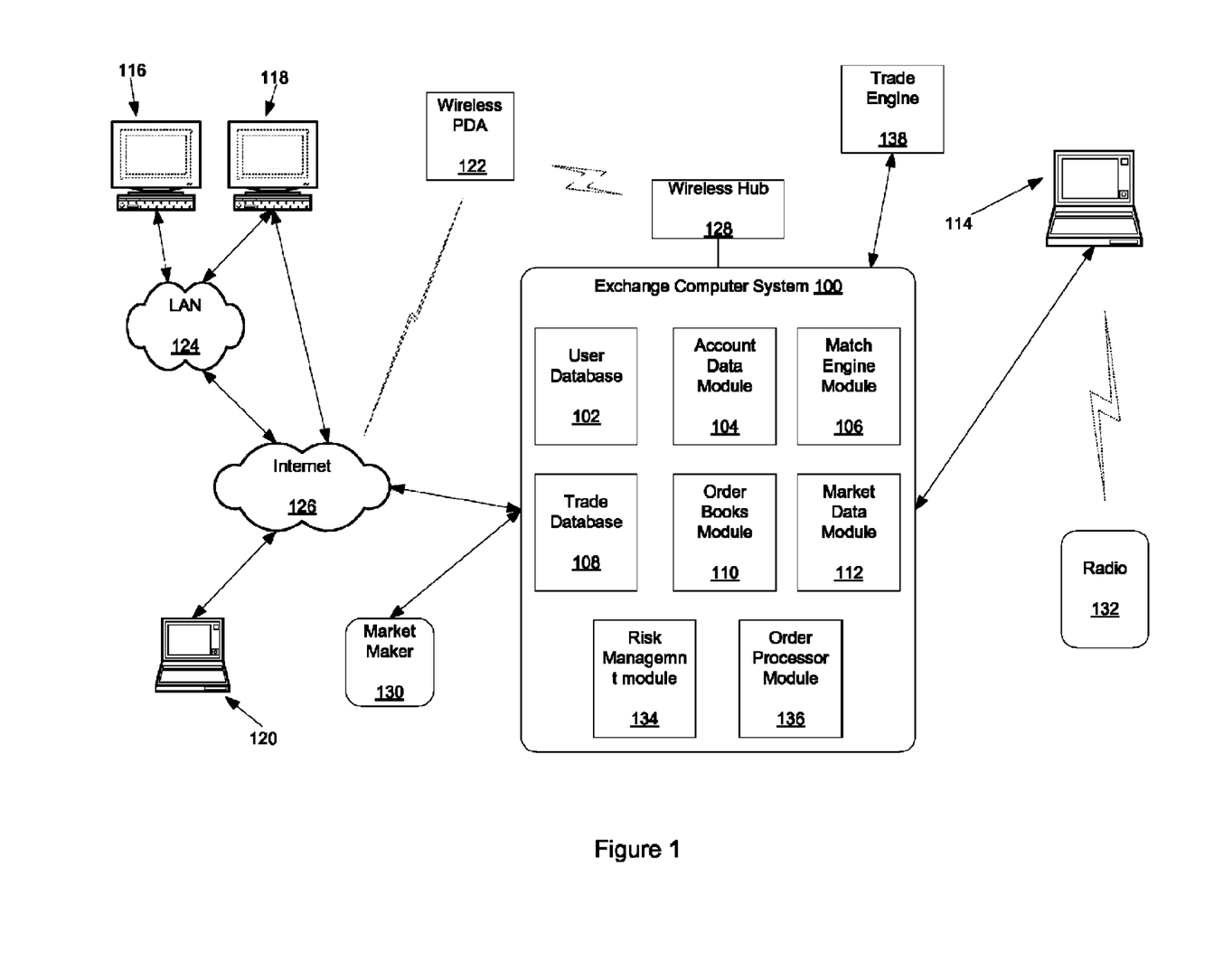
FIG. 1 shows a computer network system that may be used to implement aspects of the invention.

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Exemplary Embodiments

Figure 2:
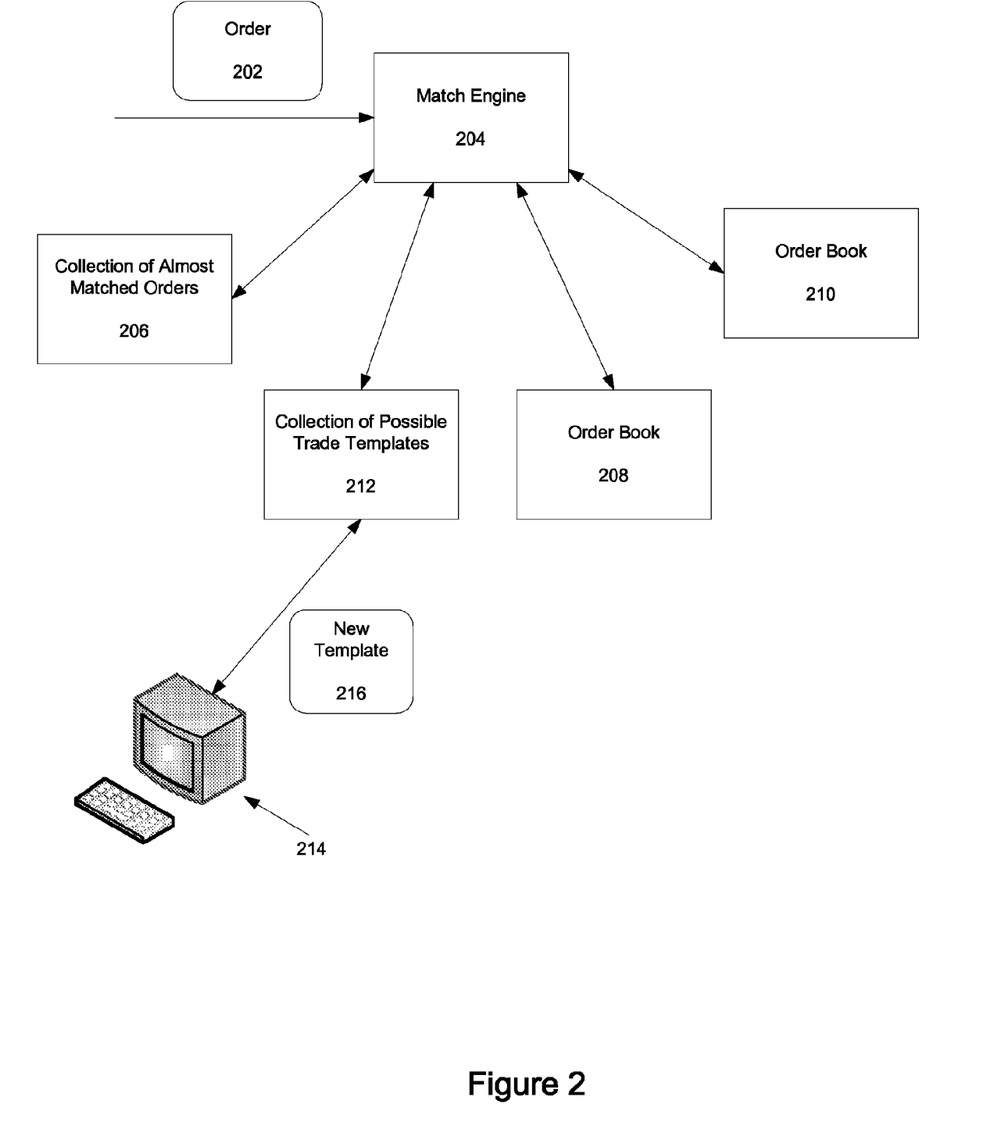
FIG. 2 shows a system that may be used to match orders in accordance with an embodiment of the invention.

FIG. 2 shows a system that may be used to match orders in accordance with an embodiment of the invention. A new order for a financial instrument 202 is received at a match engine 204. Match engine 204 may be similar to match engine module 106 (shown in FIG. 1). As will be described below, match engine 204 attempts to match new order 202 to data included in a collection of almost matched orders 206 and pending orders included in order books 208 and 210. Collection of almost matched orders 206 and/or order books 208 and 210 may be stored in a microprocessor memory. The microprocessor may be used to implement a match engine.

Figure 4:
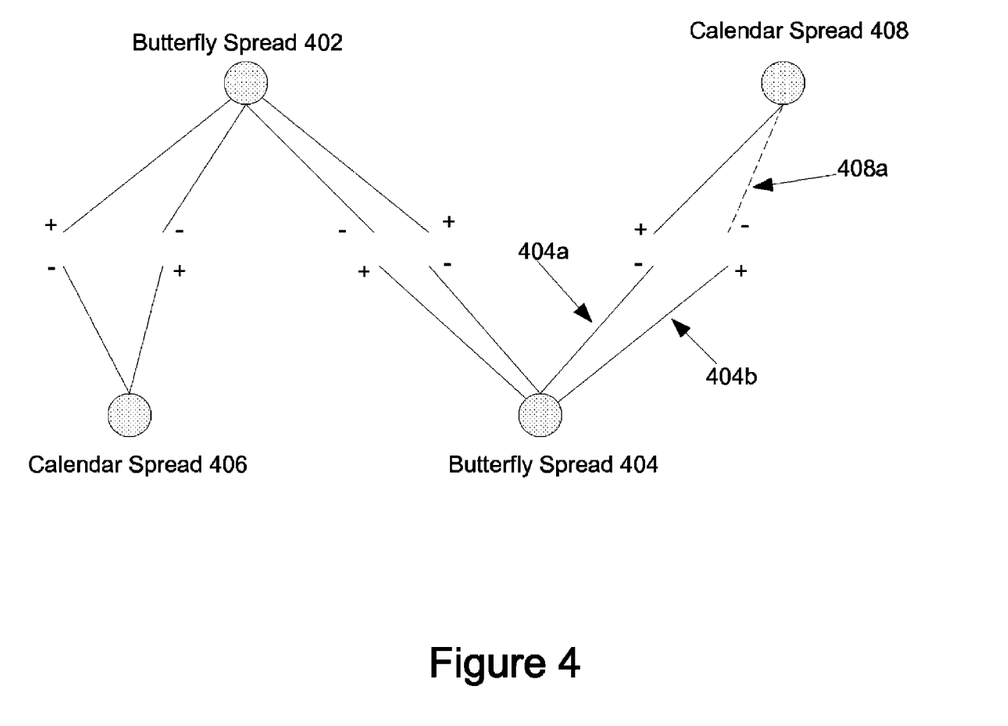
FIG. 4 shows a trade template that consists of trades for two butterfly spreads and two calendar spreads, in accordance with an embodiment of the invention.

Templates for a variety of acceptable trades may be included in a collection of possible trade templates 212. The collection of possible trade templates 212 may identify the structures of a variety of different trades that may involve spread products, such as butterfly spreads, calendar spreads, or crack spreads, as well as other combinations of financial instruments. FIG. 4 shows a template that consists of trades for two butterfly spreads 402 and 404 and two calendar spreads 406 and 408. Orders for spread products 402, 404, 406 and 408 may be received from a variety of combinations of trading entities. For example, a first trader may transmit an order to an exchange for one side of each of spread products 402, 404, 406 and 408. The template may be used to match that order to separate orders for the other sides of spread products 402, 404, 406 and 408. In alternative embodiments, the template may be used to match orders that include orders for individual legs of spread products 402, 404, 406 and 408. Other templates may include combinations of more or fewer financial instruments. Some or all of the financial instruments may be implied financial instruments.

A computer device 214 may be used to add new templates, such as new template 216, to the collection of possible trade templates 212. A plurality of algorithms may be used to create templates and such templates may be added on the fly or during a trading session. In some embodiments computer device may display a graphical user interface to a user that allows the user to create new templates. In other embodiments, described in detail below, computer device 214 may be programmed with computer-executable instructions to analyze instruments and suggest new templates.

Figure 3:
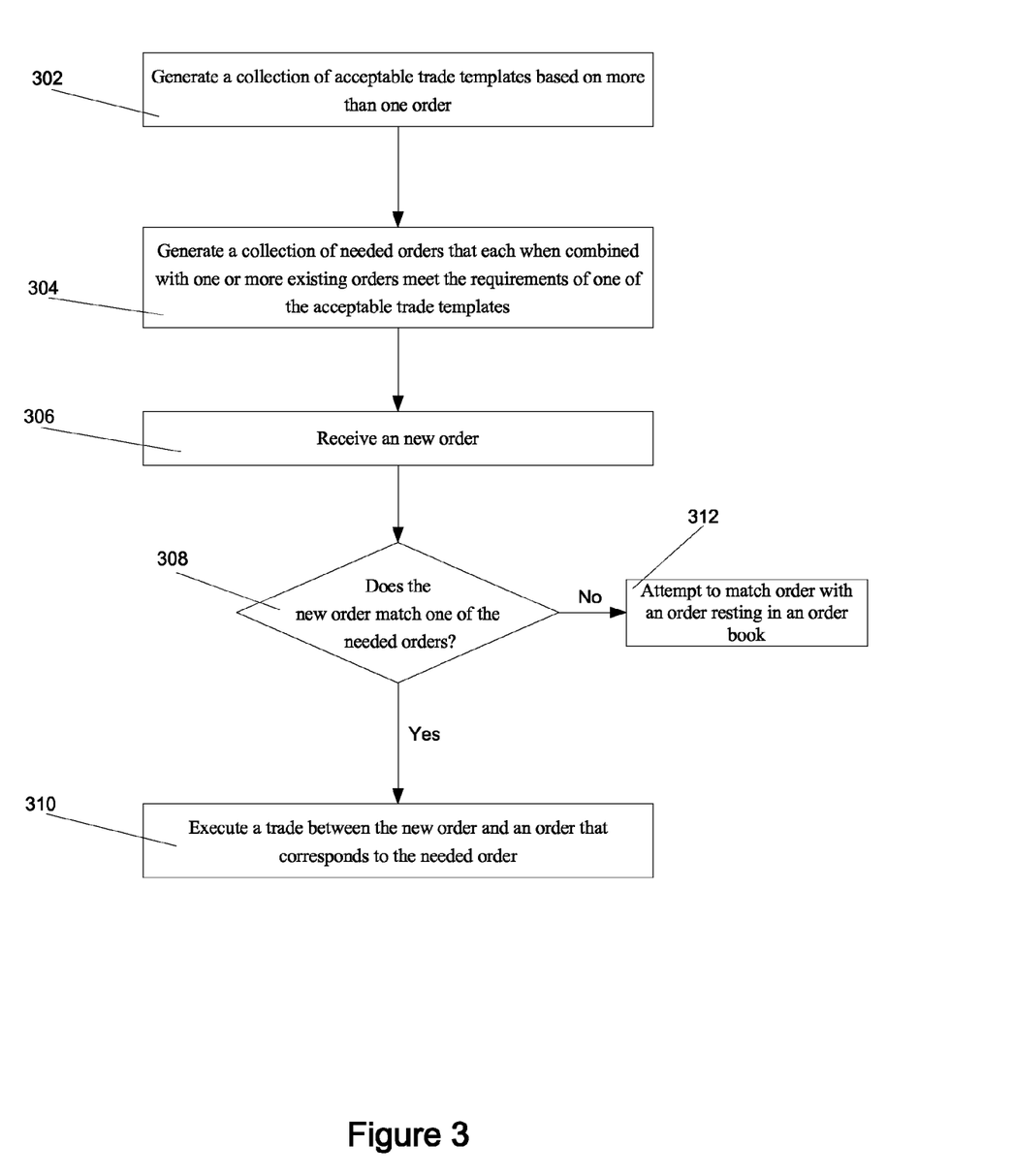
FIG. 3 illustrates a method that may be used to match orders for financial instruments, in accordance with an embodiment of the invention.

FIG. 3 illustrates a method that may be used to match orders for financial instruments, in accordance with an embodiment of the invention. First, in step 302 a collection of acceptable trade templates having more than one order is generated. Some templates may involve a variety of complex and multilevel transactions. Next, in step 304 a collection of needed orders that each when combined with one or more existing orders meets the requirements of one of the acceptable trade templates is generated. FIG. 4 shows a trade template that consists of trades for two butterfly spreads 402 and 404 and two calendar spreads 406 and 408. Leg 408a is shown with a dashed line to represent that at least one order does not currently exist to complete the template. If only one order is needed, that information may be added to collection of almost matched orders 206. Step 304 may include using a computer device to compare existing orders in order books 208 and 210 to the acceptable trade templates.

Next, in step 306 a new order is received. The order may be received at match engine 204. In step 308, it is determined whether the new order matches one of the needed orders. For example, it is determined whether the new order would result in one of the possible trade templates being complete. When the new order does match one of the needed orders, in step 310, a trade between the new order and an order that corresponds to the needed order may be executed. Step 310 may include executing a plurality of trades contemporaneously, such that all of the trades comprising a template are executed before the change in a market. When the new order does not match one of the needed orders, in step 312 an attempt is made to match the order with an order resting in an order book. Step 312 may include utilizing a conventional order match process.

When attempting to match orders, a match engine, such as match engine 204 selects orders having the best price. When a group of orders are combined in accordance with a template and one or more prices are unknown, last trade prices, previous settle prices or a variety of conventional algorithms may be used to determine prices. In one embodiment, an algorithm may use a group of linear equations to derive the price of one leg of a spread product.

Almost matched orders may also be used to create implied instruments. For example, in FIG. 4 if all of the legs of the combination of butterfly spread 402, butterfly spread 404 and calendar spread 406 are matched except for legs 404a and 404b, the result will be an implied calendar spread that may be listed on an exchange with a price needed to complete the template.

Figure 5A:
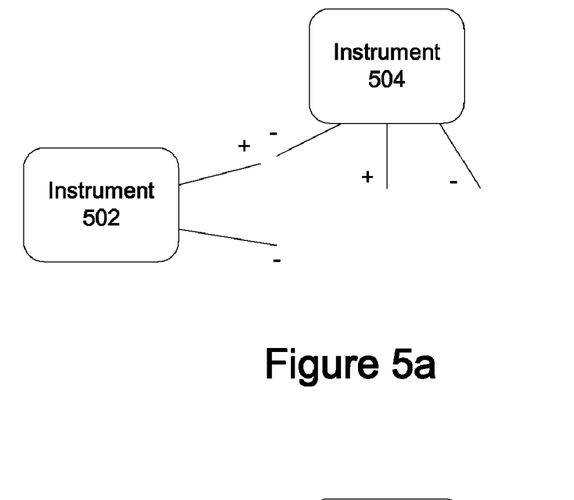
FIGS. 5a, 5b and 5c illustrate a process for matching legs of instruments to create a template, in accordance with an embodiment of the invention.
Figure 5B:
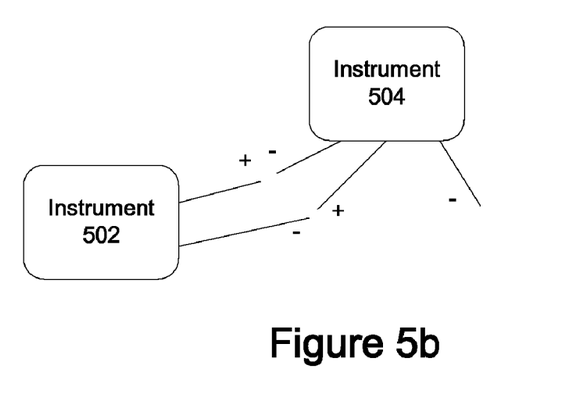

Acceptable trade templates may be created by analyzing individual legs of a group of financial instruments. FIG. 5a, for example, shows a first leg of instrument 502 matched with a first leg of instrument 504. After the first leg of instrument 502 and the first leg of instrument 504 are matched, three legs remain unmatched. In accordance with some embodiments of the invention, some algorithms may give preference to instruments that are already included in the template. For example, FIG. 5b shows a second leg of instrument 504 matched with a second leg of instrument 502. The second leg of instrument 502 is given preference over a similar leg of another instrument to minimize the number of instruments included in a template.

Figure 5C:
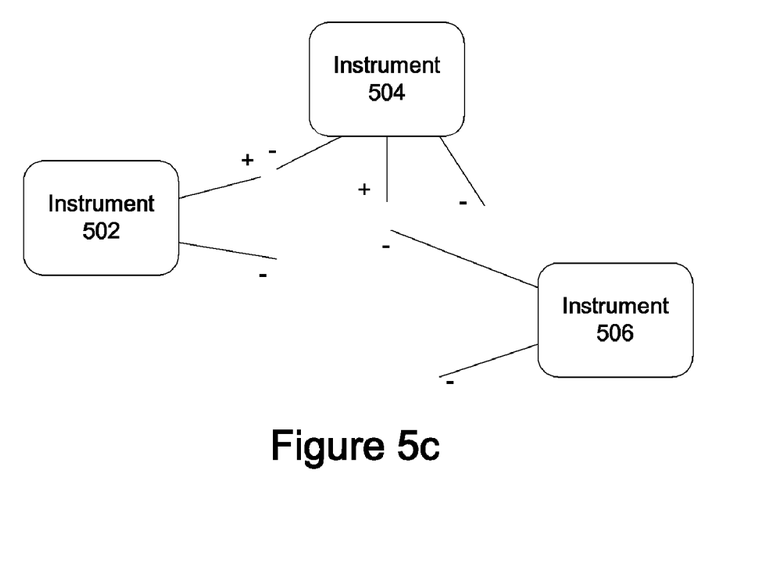

When one of the legs of an instrument does not match a leg and another instrument already included in the template, the legs of other instruments may be analyzed to locate a match. FIG. 5c, for example, shows a second leg of instrument 504 matched with a first leg of instrument 506.

Figure 6:
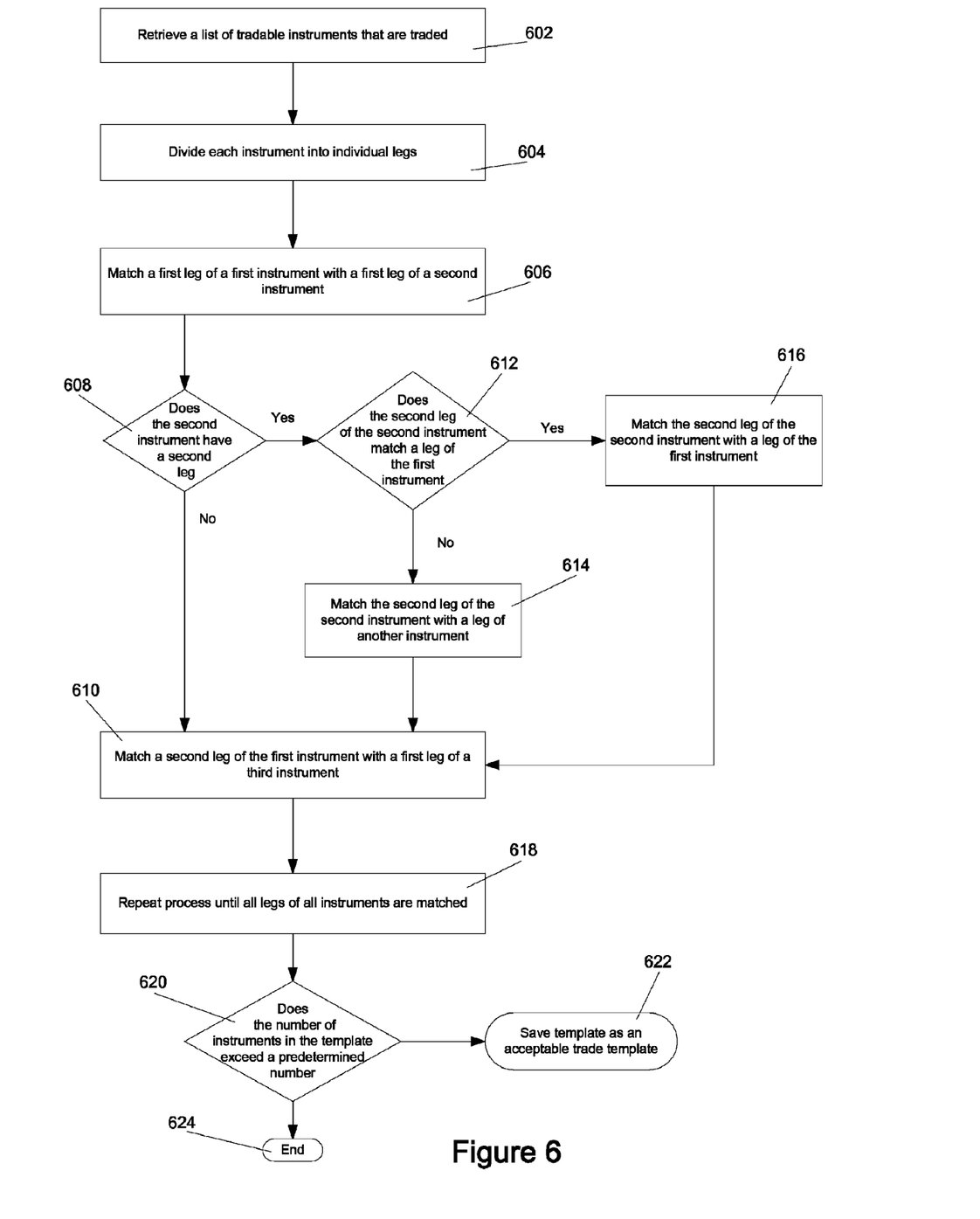
FIG. 6 illustrates an exemplary method of creating acceptable trade templates in accordance with an embodiment of the invention.

FIG. 6 illustrates an exemplary method of creating acceptable trade templates in accordance with an embodiment of the invention. First, in step 602 a list of tradable instruments is retrieved. The list may include all instruments that are tradable at an exchange, a subset of all instruments that are tradable at an exchange or another collection of instruments. In step 604 each instrument is divided into individual legs. For example, butterfly spreads are divided into four legs. Next, in step 606 a first leg of a first instrument is matched with a first leg of a second instrument.

In step 608 it is determined whether the second instrument has a second leg. When the second instrument does not have a second leg, in step 610 a second leg of the first instrument is matched with a first leg of a third of instrument. When the second instrument has a second leg, in step 612 is determined whether the second leg of the second instrument matches a leg of the first instrument. When there is no match, in step 614 the second leg of the second instrument is matched with a leg of another instrument.

Of course, if no match can be found, the process ends without the creation of an acceptable trade template. When the second leg of the second instrument matches a leg of the first instrument, in step 616 the second leg of the second instrument is matched with a leg of the first instrument.

In step 616 the process is repeated until all legs of all instruments are matched. Step 616 may include repeating different iterations of steps 606 through 616 until all legs are matched or it is determined that one or more legs cannot be matched.

After a template is created by matching all of the legs of the instruments in the template, in step 618 it is determined whether the number of instruments in the template exceeds a predetermined number. The predetermined number may be a maximum number of instruments that are allowed to comprise an acceptable trade template. When the number of instruments does not exceed the predetermined number, the template is saved as an acceptable trade template in step 622. When the number does exceed the predetermined number the process ends in step 624 and the template is not considered an acceptable trade template.

Figure 7:
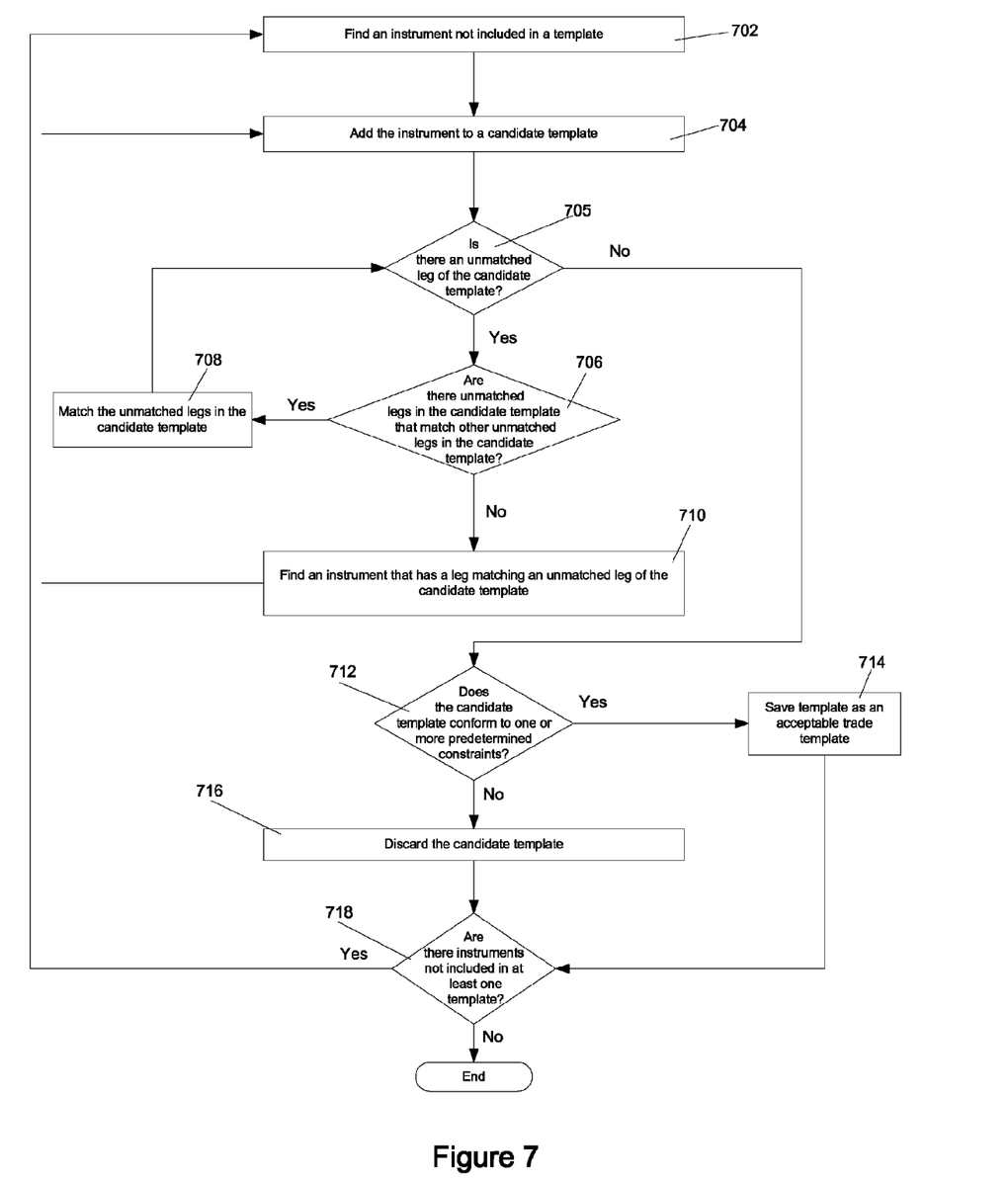
FIG. 7 illustrates an exemplary process that may be used to ensure that all tradable instruments are included in at least one template.

Some match systems that implement aspects of the invention will only attempt to match instruments that are included within templates. In such systems it may be desirable to ensure that all tradable instruments are included in at least one template. FIG. 7 illustrates an exemplary process that may be used to ensure that all tradable instruments are included in at least one template. First, in step 702 the process finds an instrument not included in a template. Step 702 may include reviewing a list of all of the instruments tradable at an exchange and identifying those instruments that are not already included in a template. Next, in step 704 the instrument is added to a candidate template. The candidate template may initially only include the single instrument. Then, it is determined whether there is an unmatched leg of a candidate template in step 705. When there is an unmatched leg, in step 706 it is determined whether there are already unmatched legs in the candidate template that match other unmatched legs in the candidate template. When there are, in step 708 the unmatched legs that are already included in the candidate template are matched and the process returns to step 705 to locate other unmatched legs. When there are not unmatched legs in the candidate template that may be matched, in step 710 the process finds an instrument that has a leg matching an unmatched leg of the candidate template. Set 710 may include locating another instrument tradable at an exchange that has a leg that matches an unmatched leg of the candidate template. After step 710, the process returns to step 704.

Returning to step 705, when there are no longer any unmatched legs in the candidate template, in step 712 is determined whether the candidate template conforms to one or more predetermined constraints. The predetermined constraints may include maximum number of instruments that may be included in a template, limits on combinations of particular instruments and may be included in templates or any other criteria. When the candidate template does conform to the constraints, in step 714 the template is saved as an acceptable trade template. When the candidate template does not conform to the one or more predetermined constraints, in step 716 the candidate template is discarded. Finally, in step 718 it is determined whether there are still instruments that are not included in at least one template. When there are not, the process ends. When there are instruments that are not included in at least one template, the process returns to step 702.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended claims.

The invention claimed is:

1. A method of matching orders for financial instruments, the method comprising:
   (a) generating at a microprocessor a collection of acceptable trade templates that are each based on more than one order;
   (b) generating at a microprocessor a collection of needed orders that each when combined with one or more existing orders meet the requirements of an acceptable trade template and allow the matching of all of the orders that form the acceptable trade template;
   (c) receiving a new order;
   (d) comparing at a microprocessor the new order to the needed orders in the collection of needed orders;
   (e) when the new order matches one of the needed orders executing at a microprocessor a trade between the new order and an order corresponding to the needed order, and
   wherein at least one of the acceptable trade templates includes at least two spread products.

2. The method of claim 1, wherein the collection of needed orders is stored in a microprocessor memory.

3. The method of claim 1, wherein one of the at least two spread products comprises an implied spread product.

4. The method of claim 1, wherein one of the at least two spread products comprises a butterfly spread product.

5. The method of claim 1, wherein one of the at least two spread products comprises a crack spread product.

6. The method of claim 1, wherein one of the acceptable trade templates includes at least three spread products.

7. The method of claim 1, further comprising using more than one algorithm to generate the collection of acceptable trade templates.

8. The method of claim 1, wherein (d) further includes executing at a microprocessor at least two additional trades contemporaneously with the execution of the trade between the new order and one of the needed orders.

9. A system that matches orders for financial instruments, the system comprising:
   a memory containing a collection of acceptable trade templates based on more than one order;
   a memory containing a collection of needed orders that each when combined with one or more existing orders meet the requirements of an acceptable trade template and allow the matching of all of the orders that form the acceptable trade template;
   a match engine configured to compare a new order to the needed orders in the collection of needed orders and execute a trade between the new order and an order corresponding to the needed order when the new order matches one of the needed orders: and
   wherein at least one of the acceptable trade templates includes at least two spread products.

10. The system of claim 9, wherein the match engine comprises a microprocessor having a memory.

11. The system of claim 10, wherein the collection of needed orders is stored in the microprocessor memory.

12. The system of claim 9, further including at least one order book connected to the match engine.

13. The system of claim 9, further including a collection of acceptable trade templates that are each based on more than one order.

14. The system of claim 13, further including a computer device programmed with computer-executable instructions to analyze orders resting in a plurality of order books and suggest new templates that would result in the matching of groups of orders.

15. A computer-readable medium containing computer-executable instructions for causing a match system to perform the steps comprising:
   (a) accessing a collection of acceptable trade templates that are each based on more than one order;
   (b) generating a collection of needed orders that each when combined with one or more existing orders meet the requirements of an acceptable trade template and allow the matching of all of the orders that form the acceptable trade template;
   (c) receiving a new order;
   (d) comparing the new order to the needed orders in the collection of needed orders; (e) when the new order matches one of the needed orders executing a trade between the new order and an order corresponding to the needed order; and
   wherein at least one of the acceptable trade templates includes at least two spread products.

16. The computer-readable medium of claim 15, wherein one of the at least two spread products comprises an implied spread product.

17. The computer-readable medium of claim 15, wherein One of the at least spread products comprises a butterfly spread product.

* * * * *